US007774006B2

(12) United States Patent
Huggett et al.

(10) Patent No.: US 7,774,006 B2
(45) Date of Patent: Aug. 10, 2010

(54) APPARATUS AND METHOD FOR IMPROVING SHORT MESSAGE SERVICE DEPENDABILITY

(75) Inventors: Robert Huggett, Reading (GB); Nicholas William Worth, Markham (CA); Jiwei R. Wang, Kanata (CA)

(73) Assignee: Airwide Solutions Inc., Reading (GB)

( * ) Notice: Subject to any disclaimer, the term of this patent is extended or adjusted under 35 U.S.C. 154(b) by 1048 days.

(21) Appl. No.: 11/351,566

(22) Filed: Feb. 10, 2006

(65) Prior Publication Data

US 2007/0178919 A1    Aug. 2, 2007

Related U.S. Application Data

(63) Continuation-in-part of application No. 11/346,419, filed on Feb. 2, 2006, now abandoned.

(51) Int. Cl.
*H04M 1/725* (2006.01)
*H04W 4/00* (2009.01)
(52) U.S. Cl. .................. 455/466; 455/412.1; 455/412.2
(58) Field of Classification Search .............. 455/412.1, 455/412.2, 466
See application file for complete search history.

(56) References Cited

U.S. PATENT DOCUMENTS

| 6,178,331 | B1 | 1/2001 | Holmes et al. | |
|---|---|---|---|---|
| 2003/0208374 | A1* | 11/2003 | Mangtani et al. | 705/1 |
| 2006/0148495 | A1* | 7/2006 | Wilson | 455/466 |

FOREIGN PATENT DOCUMENTS

| EP | 1 380 183 B1 | 9/2004 |
|---|---|---|
| GB | 2378 357 B | 8/2003 |
| GB | 2386 799 B | 6/2004 |
| GB | 2399 994 B | 7/2005 |
| GB | 2399 995 B | 7/2005 |
| GB | 2399 997 B | 7/2005 |
| GB | 2401 757 B | 10/2005 |
| WO | WO/96/36194 | 11/1996 |
| WO | WO03/069924 A2 | 8/2003 |

OTHER PUBLICATIONS

Wang Y.-M. et al.: "The SIMBA user alert service architecture for dependeable alert delivery", Proceedings of the International Conference on Dependable Systems and Networks, Jul. 1, 2001-Jul. 4,2001, pp. 463-472 XP00104232.

* cited by examiner

*Primary Examiner*—Patrick N Edouard
*Assistant Examiner*—Matthew W Genack
(74) *Attorney, Agent, or Firm*—Shalom Wertsberger; Saltamar Innovations

(57) ABSTRACT

An apparatus and a method for improving short message service dependability by reducing the risk of an SM being loss due to failure in a network having both an SMS routers and an SMSC and in which forward and store delivery or Early-Ack is enabled in the router.

Alternative apparatus and methods are presented which mitigate the possibility of losing an SM before it is delivered to a recipient or received and persistently stored by the SMSC by placing the SM in a survivable storage medium before acknowledgement of the SM is sent to the submitter of the SM and by providing a recovery mechanism that can re-attempt a delivery or a forwarding of the SM, based on the content of the survivable storage medium, in the case of a failure.

16 Claims, 7 Drawing Sheets

APPARATUS AND METHOD FOR IMPROVING SHORT MESSAGE SERVICE DEPENDABILITY

CROSS-REFERENCE TO RELATED APPLICATIONS

This application is a continuation-in-part of U.S. patent application Ser. No. 11/346,419, entitled "Apparatus and Method for Improving Short Message Service Dependability" filed on Feb. 2, 2006, and claims the benefit, pursuant to 35 U.S.C. §120, of that application.

BACKGROUND OF INVENTION

1. Field of the Invention

The present invention relates to the field of mobile telephony short message service (SMS). In particular, to an apparatus and a method for improving short message service dependability.

2. Background Art

FIG. 1 is a schematic representation of an exemplary short message service (SMS) network architecture 100 illustrating message flows.

In the above short message service network architecture both a router 110 and a short message service center (SMSC) 120 have Signaling System 7 (SS7)/Internet Engineering Task Force (IETF) SIGTRAN interfaces to a public land mobile network (PLMN) 130. The router 110 and the SMSC 120 communicate with each other using a standard short messaging stack (for Global System for Mobile Communications (GSM) networks this is defined in GSM 03.40 & Mobile Application Part (MAP), for 3rd Generation Partnership Project (3GPP) by European Telecommunications Standard Institute (ETSI) 23.040 and MAP and for code division multiple access (CDMA) networks it is defined in the IS-41 specification). An interface between the router 110 and the SMSC 120 frequently uses the same stack as that used to connect each of the router 110 and the SMSC 120 respectively to the mobile network 130. Alternatively the interface between the router 110 and the SMSC 120 can use IP based Short Message Peer to Peer Protocol (SMPP) defined in the SMPP Developer Forum's Short Message Peer to Peer Protocol Specification v3.4.

Mobile originated (MO) short messages (SM) are handled initially by the router 110. Typically 80% or more of mobile terminated (MT) SM are delivered at the first attempt so the router 110 will immediately attempt to deliver the SM. If this delivery attempt fails then the router 110 passes the SM to the SMSC 120. The SMSC 120 stores the SM and at a later time makes further attempts to deliver it.

MO SM are handled initially by the router 110. Typically in excess of 95% of fixed terminated (FT) SM are delivered at the first attempt so the router 110 will immediately attempt to deliver the SM via a gateway 140. If this delivery attempt fails then the router 110 passes the SM to the SMSC 120. The SMSC 120 stores the SM and at a later time makes further attempts to deliver it.

Fixed originated (FO) SM are initially handled by the gateway 140. If an application server 150 that originated the FO SM selects single shot quality of service then the SM is forwarded directly to the router 110 for delivery. If store and forward quality of service is selected then the gateway 140 forwards the SM to the SMSC 120 instead.

Alternatively the gateway 140 can send all FO-MT SM to the router 110 for an initial delivery attempt, and if this fails the router 110 can forward them to the SMSC 120 for storage and forwarding.

The SMS network can comprise one of more of each of the router 110, the SMSC 120 and the gateway 140 to, for example, to increase the SMS traffic handling capacity. Individual router 110, SMSC 120 and gateway 140 may be group to provide one service or alternatively all of the routers 110, SMSC 120 and gateways 140 may to cross-connected in a network configuration.

When first launched in the 1990's the SMS was strictly a store and forward service. SM were stored persistently in an SMSC 120 and then delivery was attempted. This meant that once an SM had been acknowledged to the submitter it was secured to persistent storage and nothing short of the complete failure of the SMSC 120 or multiple disk failure could result in its loss. This approach is secure and helps to ensure accurate real time charging, but it drives up the cost of the SMSC 120 because expensive storage subsystems are needed to achieve even moderate throughputs. The store and forward based reliability mechanism established the sense of dependability of the SMS in consumers' (i.e. users) perception.

Over time the volume of SM sent has increased by several orders of magnitude, and the unit price of an SM has dropped significantly. Because profit margins are now lower operators have sought to reduce costs when increasing their SMS network capacity. Many networks no longer offer a true store and forward service, but instead offer a less dependable alternative commonly referred to as forward and store. Forward and store is where an attempt is made to deliver the SM (hereafter referred to as the First Delivery Attempt or FDA) before writing it to persistent storage and only storing it if the FDA attempt fails. Clearly if a high proportion of these delivery attempts are successful (which is the norm in a modern network) this approach significantly reduces the number of SM that need to be stored, and thus reduces the cost of a SMSC platform for a given capacity. Superficially the risk involved in the forward and store quality of service does not appear great because theoretically the SMSC can defer acknowledging the SM until after it has safely stored it. However in practice this approach is only viable for MO-FT SM and some FO-MT SM, not for the majority case—MO-MT. The reason for this is that when a mobile handset originates an SM it starts a timer. If the SM is not acknowledged before this timer expires then the handset automatically retransmits the SM. In a typical GSM network approximately 5% of all delivery attempts take longer to complete than the timeout period of the timer. This means that for MO-MT SM the SMSC 120 must acknowledge receipt of the SM before it has stored it in at least some cases in order to avoid duplicate delivery of the SM to its recipient. The acknowledgement of the SM before it has been stored is known as 'early acknowledgement' (Early-Ack) as described in United Kingdom patent GB2401757B issued Jun. 10, 2005. If a component of the SMSC 120 fails between sending the acknowledgement and storing the SM then not only is the SM lost, but the submitter (i.e. originator) is unaware of this because the SM has been acknowledged to them. These lost SM reduce subscriber confidence in what was previously seen as a highly reliable service.

For some years now some network operators have had SMS routers (therein after routers) in their networks. Initially these systems were only used to load balance traffic between multiple SMSC 120 and as such did not alter the dependability of the service. Recently the majority of routers 110 have acquired the ability to offer the forward-and-store quality of service described above (i.e. FDA and forward to the SMSC 120 if the FDA fails). This approach significantly increases the risk of failure when compared with the store-and-forward implementation described above (internal to the SMSC 120). In the architecture having a router 110 providing forward-and-store functionality, the router 110 acknowledges the SM to the submitter and then attempts delivery. If this delivery attempt fails the router 110 then forwards the SM to the SMSC 120 that stores it. There are three potential points of failure after the receipt of the SM has been acknowledged:

The router 110 itself could fail before forwarding the SM to the SMSC 120.
   The communications network between the router 110 and the SMSC 120 could fail.
   Finally the SMSC 120 could fail before securing the SM to disk.

If a router 110 is running a pure forward and store service at a traffic rate of 2,000 SM/second and the typical time to deliver an SM is 10 seconds then up to 20,000 previously acknowledged (and potentially charged for) SM will be lost if the router 110 fails.

In some countries there are statutory requirements on the accuracy of telephony billing systems. In situations where SMs are charged for in real time (for example pre-pay phones) the combination of the issues listed above may put operators at risk of exceeding their permitted number of charging errors. The degree of risk depends on the exact mechanism used for real time charging.

The forward and store quality of service also potentially weakens the ability of an SMSC 120 to perform the duplicate checks intended to allow it to identify retransmissions. This is a result of the SMSC 120 potentially having no record of the SM that it has delivered without storing them and therefore the SMSC 120 has nothing to compare new SM to in order to determine if they are duplicates.

SUMMARY OF INVENTION

An apparatus and a method for improving short message service dependability by reducing the risk of an SM being loss due to failure in a network having both an SMS routers and an SMSC and in which forward and store delivery or Early-Ack is enabled in the router.

Alternative apparatus and methods are presented which mitigate the possibility of losing an SM before it is delivered to a recipient or received and persistently stored by the SMSC by placing the SM in a survivable storage medium before acknowledgement of the SM is sent to the submitter of the SM and by providing a recovery mechanism that can re-attempt a delivery or forwarding of the SM, based on the content of the survivable storage medium, in the case of a failure.

An exemplary embodiment can provide a method for improving short message service (SMS) dependability in a mobile telephony network having a short message service center (SMSC) that can provide for persistently storing and forwarding of short messages (SM) to respective addressees and a router that first receives the SM and mitigates the number of SM forwarded to the SMSC by attempting to deliver a portion of the SM received, the method comprising the steps of: receiving a SM from a submitter; creating a first log entry, including a copy of the SM, in a log store; acknowledging receipt of the SM to the submitter; attempting one of a first delivery attempt (FDA) of the SM to an addressee and a forwarding (FWD) of the SM to the SMSC, on successful completion of the one of the FDA and the FWD, creating a second log entry, including an indication of the successful completion, in the log store; on recovery from a failure, determining if the SM might have been lost by searching the log store for the second log entry and if the second log entry is not found re-attempting the one of a FDA and a FWD using the copy of the SM included in the first log entry; wherein the log store is a survivable storage medium whose contents can survive a failure of the router and wherein the step of creating a first log entry occurs before the step of acknowledging.

Another exemplary embodiment can provide a method for improving short message service (SMS) dependability in a mobile telephony network having a short message service center (SMSC) that can provide for persistently storing and forwarding of short messages (SM) to respective addressees and a router that first receives the SM and mitigates the number of SM forwarded to the SMSC by attempting to deliver a portion of the SM received, the method comprising the steps of: receiving a SM from a submitter; creating a copy of the SM in a replicate store; acknowledging receipt of the SM to the submitter; attempting one of a first delivery attempt (FDA) of the SM to an addressee and a forwarding (FWD) of the SM to the SMSC, on successful completion of the one of the FDA and the FWD, deleting the copy of the SM in the replicate store; on recovery from a failure, determining if the SM might have been lost by searching the replicate store for the copy of the SM and if the copy of the SM is found reattempting the one of a FDA and a FWD using the copy of the SM; wherein the replicate store is a survivable storage medium whose contents can survive a failure of the router and wherein the step of creating a copy of the SM occurs before the step of acknowledging.

A further exemplary embodiment can provide an apparatus for improving short message service (SMS) dependability in a mobile telephony network comprising: a mobile telephony network interface adapted to receiving a short message (SM) from a submitter in the mobile telephony network and for sending an acknowledgement to the submitter; a fixed network interface adapted to forwarding the SM to an addresses; an SMSC interface adapted to forwarding the SM to a short message service center (SMSC); a log store adapted to storing log entries and to preserving the log entries in the case of a failure of the apparatus; a log manager adapted to adding and retrieving log entries to and from the log store; a SM manager adapted to: creating a first log entry, including a copy of the SM, in the log store via the log manager; sending an acknowledgement to the submitter via the mobile telephony network interface after creating the first log entry; attempting one of a first delivery attempt (FDA) of the SM to an addressee and a forwarding (FWD) of the SM to the SMSC, via the fixed network interface and the SMSC interface respectively; and creating, on successful completion of the one of the FDA and the FWD, a second log entry, including an indication of the successful completion, in the log store via the log manager; and a recovery manager adapted to determining, on recovery from a failure, if the SM might have been lost by searching the log store for the second log entry and if the second log entry is not found re-attempting the one of a FDA and a FWD using the copy of the SM included in the first log entry.

A still further exemplary embodiment can provide an apparatus for improving short message service (SMS) dependability in a mobile telephony network comprising: a mobile telephony network interface adapted to receiving a short message (SM) from a submitter in the mobile telephony network and for sending an acknowledgement to the submitter; a fixed network interface adapted to forwarding the SM to an addresses; an SMSC interface adapted to forwarding the SM to a short message service center (SMSC); a replicate store adapted to storing a copy of the SM, and to preserving the copy of the SM in the case of a failure of the apparatus; a replicate manager adapted to adding and deleting the copy of the SM to and from the replicate store; a SM manager adapted to: adding a copy of the SM to the replicate store via the replicate manager; sending an acknowledgement to the submitter via the mobile telephony network interface after creating the first log entry; attempting one of a first delivery attempt (FDA) of the SM to an addressee and a forwarding (FWD) of the SM to the SMSC, via the fixed network interface and the SMSC interface respectively; and deleting, on successful completion of the one of the FDA and the FWD, the copy of the SM from the replicate store via the replicate manager; and a recovery manager adapted to determining, on recovery from a failure, if the SM might have been lost by searching the replicate store for the copy of the SM and if the copy of the SM is not found re-attempting the one of a FDA and a FWD using the copy of the SM.

Other aspects and features of the present invention will become apparent to those ordinarily skilled in the art or science to which it pertains upon review of the following description of specific embodiments of the invention in conjunction with the accompanying figures.

BRIEF DESCRIPTION OF DRAWINGS

The present invention will be described in conjunction with drawings in which.

DETAILED DESCRIPTION

An apparatus and a method for improving short message service (SMS) dependability are described herein. The apparatus is a SMS router for use in a mobile telephony network to receive SM, to make a first delivery attempt (FDA) of some of the SM to their respective addressees via, for example, a gateway or a mobile switching center (MSC), or directly to a fixed termination point (e.g. an application host server), and for the remaining SM and SM for which the FDA failed, to forward the SM to a short message service centre (SMSC). To reduce the risk of SM loss the apparatus stores (e.g. logs) SM that it receives to a survivable storage medium (e.g. a log file). In the event of a failure (e.g. of the apparatus, of communications with the SMSC or of the SMSC before it secures the SM), log records containing the logged SM can be retrieved from the survivable storage medium for recovery purposes.

Different embodiments of the apparatus (i.e. the SMS router) can provide differing trade-offs of implementation parameters such as, for example, what information is stored in a log record, the level of performance impact (and therefore cost implications) for storing the SM and the degree of SMS dependability desired.

Figure 1:
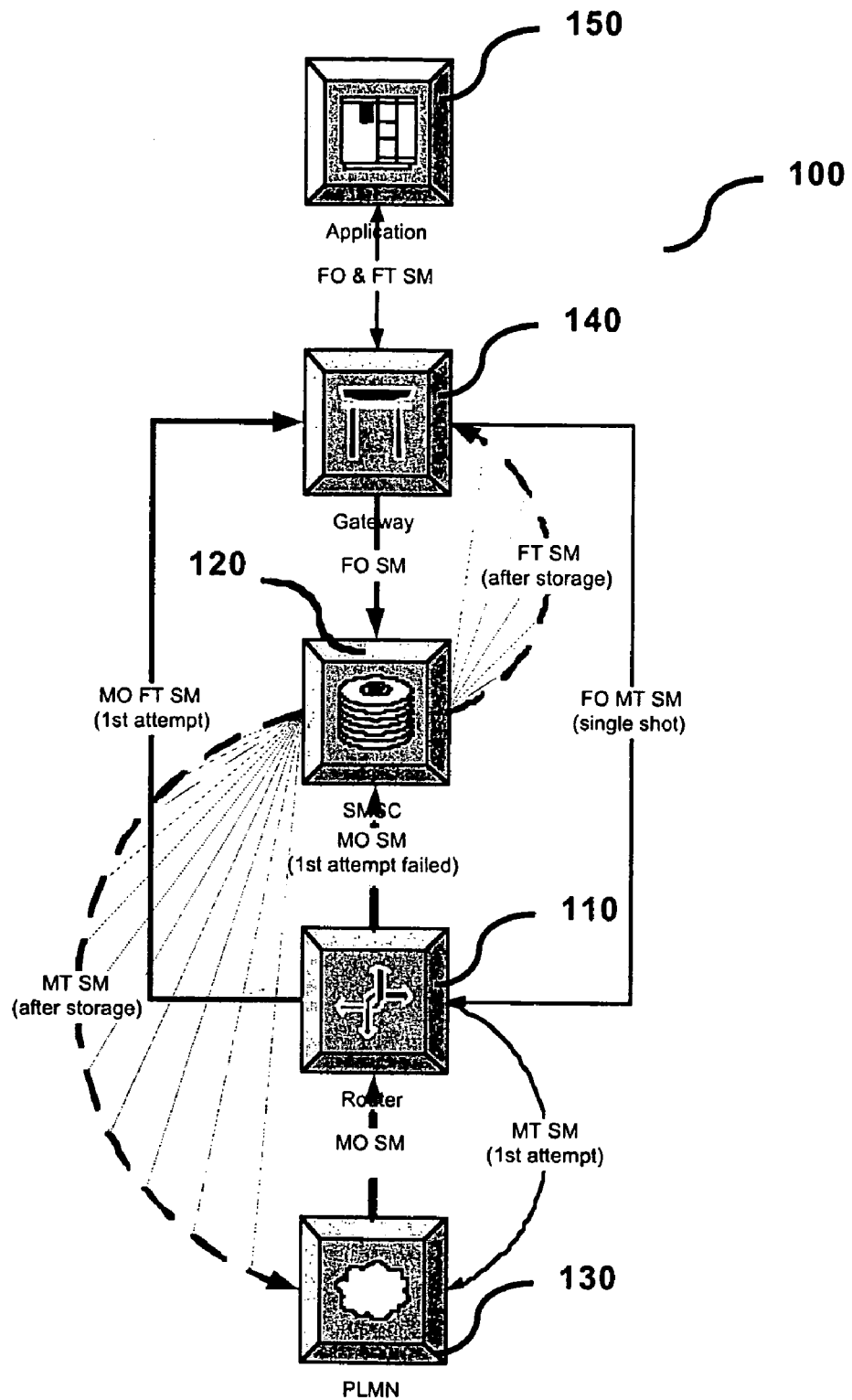
FIG. 1 is a schematic representation of an exemplary short message service network architecture illustrating message flows.
Figure 2:
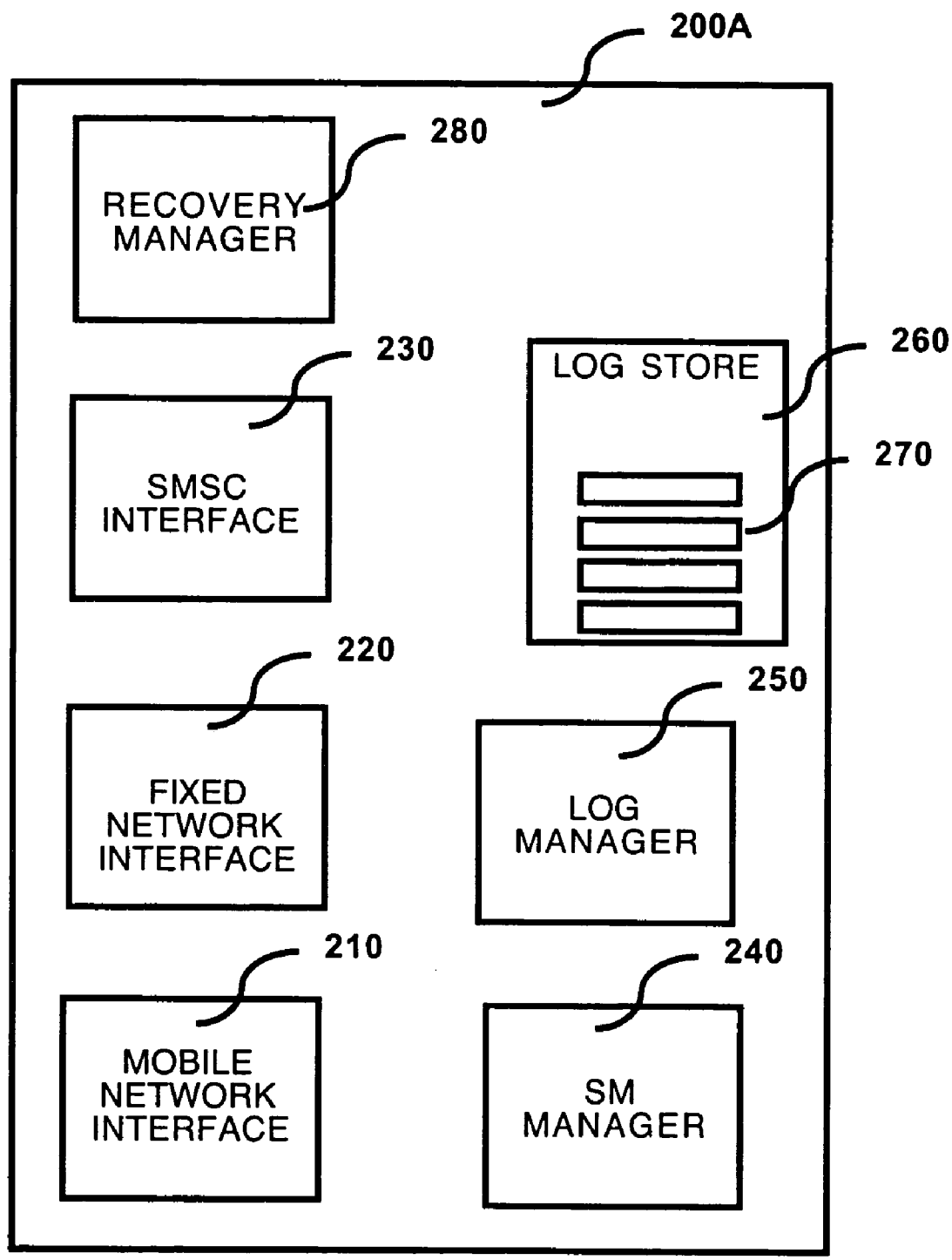
FIG. 2 is a schematic representation of a first exemplary embodiment of an apparatus for improving short message service dependability.

FIG. 2 is a schematic representation of a first exemplary embodiment of an apparatus 200A for improving SMS dependability. The apparatus 200A is a SMS router comprising a mobile telephony network interface 210, a fixed network interface 220, a short message service centre (SMSC) interface 230, a SM manager 240, a log manager 250, a log store 260 and a recovery manager 280. Short messages (SM) can be received via the mobile telephony network interface 210 from submitters (e.g. mobile phone) in a mobile telephony network (not illustrated). The mobile telephony interface 210 can also be used in a delivery attempt of a SM via a MSC (not illustrated). The SM manager 240 validates received SM resulting in each SM being either accepted or rejected. The SM manager 240 also determines, for each accepted SM, if a first delivery attempt (FDA) should be made. The SM manager 240 provides for the FDA of the SM to, for example, a MSC or an application host via the mobile telephony interface 210 or the fixed network interface 220. For SM for which a FDA was not attempted and for SM for which the FDA failed, the SM manager 240 provides for the SM to be forwarded to the SMSC via the SMSC interface 230. The SMSC provides a store and forward function for the forwarded SM. The SM manager 240 also provides for an acknowledgement, of receipt of the SM, to be sent to the submitter of SM via the mobile telephony network interface 210. The SM manager 240 can send the acknowledgement autonomously (i.e. sending of the acknowledgement is not dependent on receiving an acknowledgement from the target of the FDA or from the SMSC).

The log manager 250 provides for SM to be added to the log store 260 as log records 270. Each log record 270 can comprise a copy of the SM, an indication of whether an FDA or forward to SMSC was attempted and in the case of a forward to SMSC the identity of the SMSC. Each log record 270 is preferably time-stamped when it is added to the log store 260. The log manager 250 also provides for additional log entries to be added to the log store 260 when notification of a successful FDA or forwarding to the SMSC is received for a SM. Each additional log entry identifies a SM and signifies the successful completion of the FDA or forwarding to the SMSC. The log store 260 can be arranged as a log file in which the log records 270 are written linearly (i.e. sequentially) to a storage media in order to optimize the throughput that can be achieved by the log store 260. Preferably the log store 260 is optimized for write operation performance even though there may be a tradeoff in reduced optimization for read operations as the log store 260 will be written to frequently while it will typically only be read during failure recovery. The log store 260 is a storage medium whose contents can survive a failure of the apparatus 200A (i.e. a survivable storage medium) such as, for example, a persistent storage medium (e.g. non-volatile memory, a hard disk drive, a RAID array, a Storage Area Network (SAN) or other similar devices), a temporal storage medium (e.g. volatile memory, cache memory or other similar devices) that is accessible to the apparatus 200A but which is hosted on an independent platform, and a co-hosted temporal storage medium wherein each of two or more apparatus 200A provides a temporal storage medium for use by the other apparatus 200A. In FIG. 2 the log store 260 is illustrated as being hosted on apparatus 200A. In an alternative embodiment the log store 260 can be hosted on another independent platform (as described above with respect to the survivable storage medium) while remaining accessible to the apparatus 200A using well known remote storage access mechanisms.

In the event of a failure, the recovery manager 280 can search the contents of the log store 260 (i.e. the survivable storage medium) to determine which SM were potentially lost during the failure and sends these SM to the SM manager 240 for FDA or forwarding to the SMSC. The SM manager 240 can determined which recovered SM (i.e. identified as potentially lost) are to be FDA or forwarded to the SMSC based on which operation was outstanding during the failure, based on attributes of the SM (e.g. best effort delivery only), based on pre-determined policies (e.g. all recovered SM are forwarded to the SMSC) and combinations thereof. Searching of the log store 260 can be limited to log entries 270 having time-stamps later than the start of a predetermined period before the time of the failure. The recovery manager 280 determines which SM are potentially lost by identifying the SM having a first log entry and not having a corresponding second log entry indicating successful completion of the FDA or forward to the SMSC. The recovery manager 280 can optionally filter the SM identified from the log using SM attributes to prevent recovery of low value SM (e.g. excluding SM marked for a single delivery attempt only).

In an alternative embodiment where the log store 260 is hosted on an independent platform, preferably the recovery manager 280 is also hosted on the independent platform.

Figure 3:
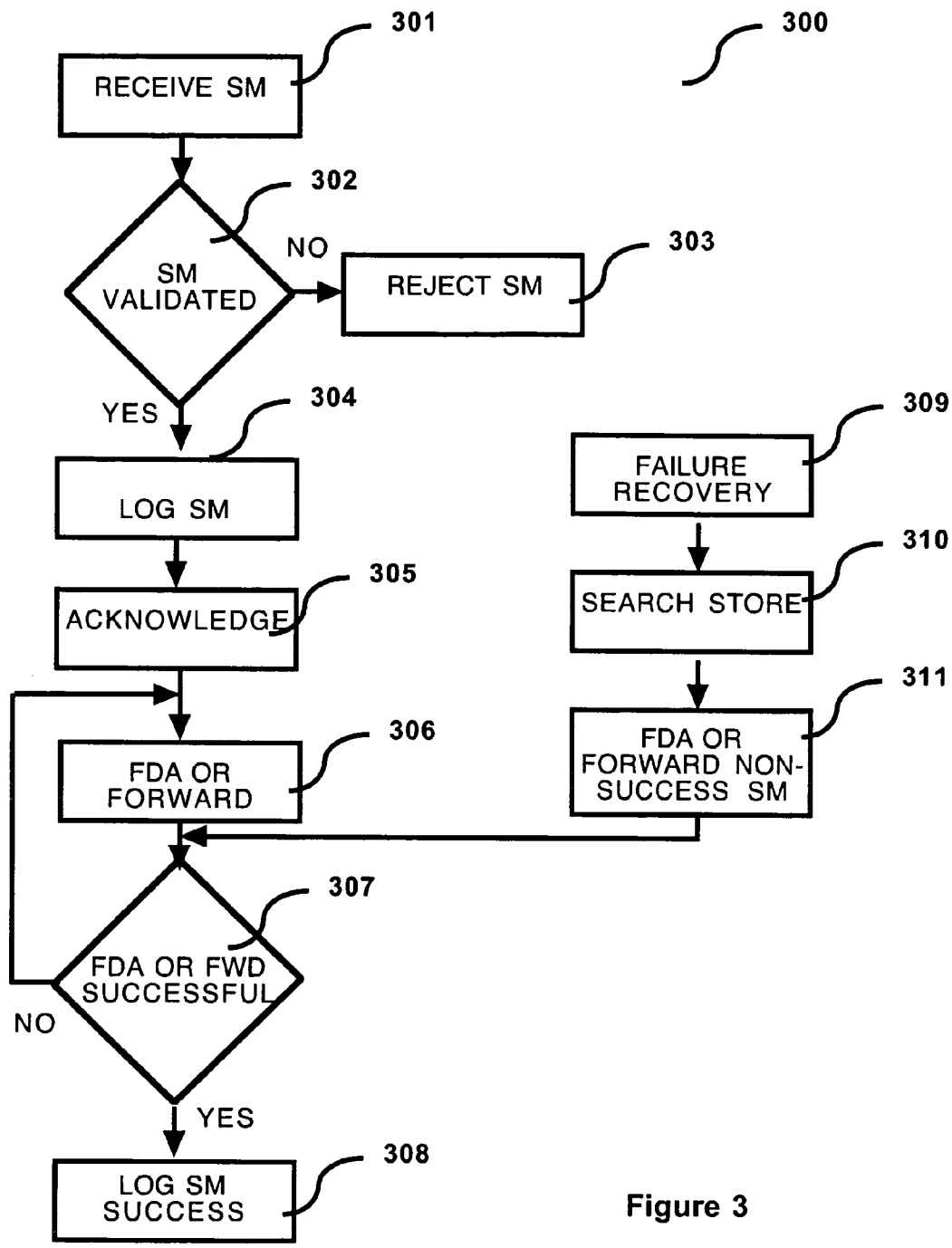
FIG. 3 is a representation of steps in a first exemplary embodiment of a method for improving short message service dependability.

FIG. 3 is a schematic representation of steps in an exemplary embodiment of a method 300 for improving short message service dependability. The method 300 can be implemented, for example, using the apparatus 200A described above with reference to FIG. 2.

In step 301 an SM is received from the mobile telephony network. The SM can be addressed to either a fixed termination (FT) point such as, for example an application server, or to mobile termination (MT) point. In step 302 the received SM is validated. In step 303 if the SM fails validation it is rejected; details of the SM can optionally be logged to the log store 260. In step 304 a copy of the SM is logged (i.e. stored) in the log store 260. In step 305 an acknowledgement is sent to the originator of the SM. In step 306, either a first delivery attempt (FDA) of the SM to the addressee of the SM is made via, for example, a gateway or MSC, or the SM is forwarded to an SMSC. The selection of the FDA or of the forwarding to the SMSC can be based on the SM type, attributes of the SM (e.g. originator, addressee), pre-defined policies (e.g. responsive to loading of the SMSC and other network elements such as a Home Location Register (HLR)) and combinations thereof. In step 307 the outcome of the FDA or the forwarding to the SMSC can be assessed. If the FDA or forwarding was successful, in step 308 a log record can be stored in the log store 260 indicating the successful deliver of the SM. If the FDA or forwarding was unsuccessful, the FDA or forwarding can be re-attempted in step 306. In step 309 recovery from a failure begins. The failures can be, for example, of the apparatus, of communications with the SMSC or of the SMSC before it secures the SM. In step 310 the contents of the log store 260 is read in order to determine which SM may not have been safely delivered. SM having both an initial log entry and a second log entry signifying their successful delivery are not recovered. SM having only an initial log entry and no subsequent log entry signifying their successful delivery are recovered from the log store 260. For each SM recovered in step 310, a FDA or forwarding can be re-attempted in step 311. A determination as to which of the recovered SM are to be FDA or forwarded to the SMSC can be based on which operation was outstanding during the failure, based on attributes of the SM (e.g. best effort delivery only), based on pre-determined policies (e.g. all recovered SM are forwarded to the SMSC) and combinations thereof.

Figure 4:
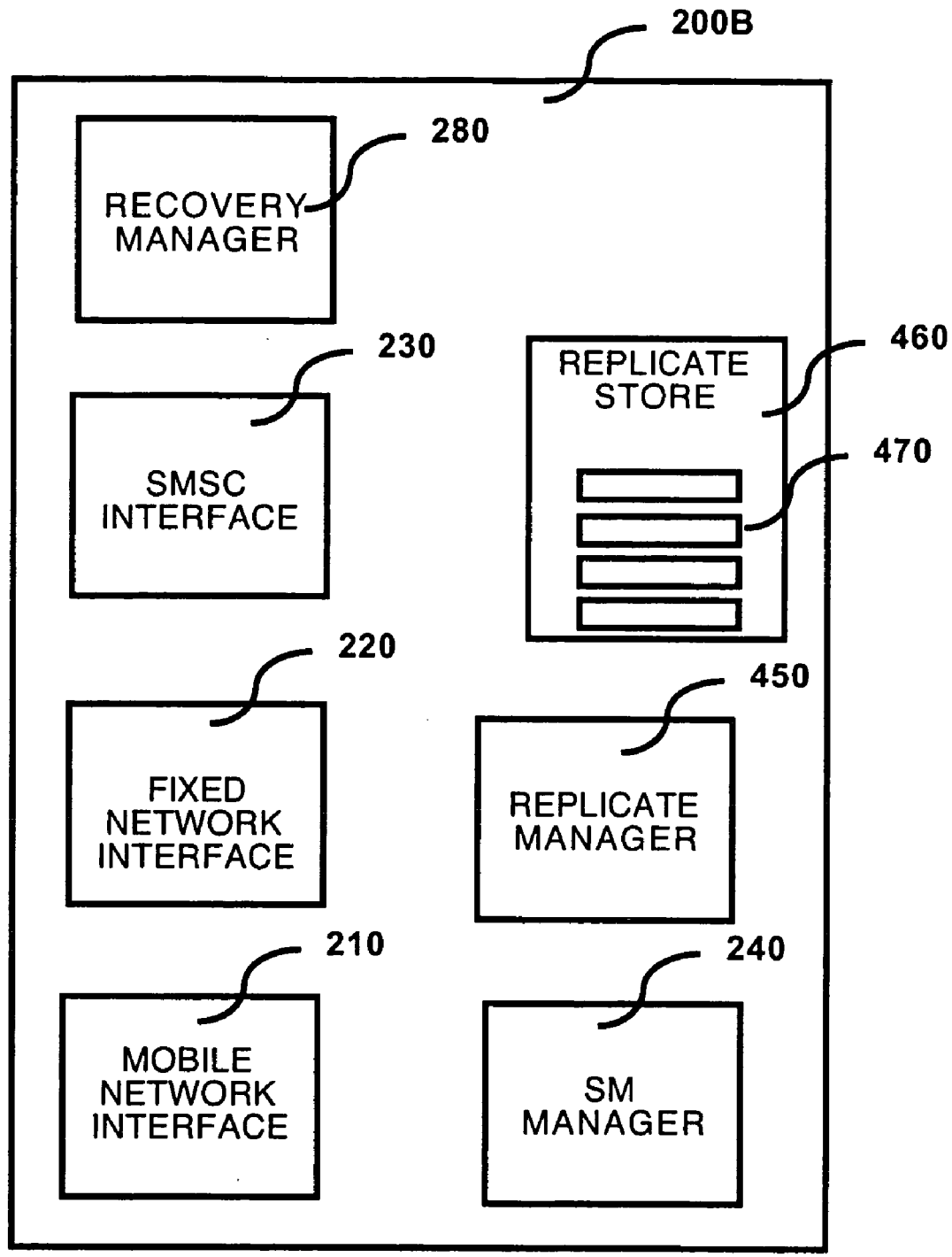
FIG. 4 is a schematic representation of a second exemplary embodiment of an apparatus for improving short message service dependability.

FIG. 4 is a schematic representation of a second exemplary embodiment of an apparatus 200B for improving short message service (SMS) dependability. The apparatus 200B is a SMS router comprising a mobile telephony network interface 210, a fixed network interface 220, a short message service centre (SMSC) interface 230, a SM manager 240, a replicate manager 450, a replicate store 460 and a recovery manager 280. The mobile telephony network interface 210, the fixed network interface 220 and the short message service centre (SMSC) interface 230 operate in substantially the same way as described above with reference to apparatus 200A and FIG. 2. The replicate manager 450 provides for addition and deletion of copies of SM 470 to and from the replicate store 460. In addition, the replicate manager 450 can provide for a message timer to be started for each SM that is added to the replicate store 460. Preferably the replicate store 460 is optimized for write and delete operations performance even though there may be a tradeoff in reduced optimization for read operations as copies of SM will be written to and delete from the replicate store 460 frequently while it will typically only be read during failure recovery. The replicate store 460 is a survivable storage medium (similar to that described above with reference to log store 260 and FIG. 2) that allows SM to be added and deleted while mitigating the performance impact on the apparatus 200B. The SM manager 240 validates received SM resulting in each SM being either accepted or rejected. The SM manager 240 also determines, for each accepted SM, if a first delivery attempt (FDA) should be made. The SM manager 240 provides for the FDA of the SM to, for example, a MSC or an application host via the fixed network interface 220. For SM for which a FDA was not attempted and for SM for which the FDA failed, the SM manager 240 provides for the SM to be forwarded to the SMSC via the SMSC interface 230. The SMSC provides a store and forward function for the forwarded SM. The SM manager 240 also provides for an acknowledgement, of receipt of the SM, to be sent to the submitter of SM via the mobile telephony network interface 210. The SM manager 240 can send the acknowledgement autonomously (i.e. sending of the acknowledgement is not dependent on receiving an acknowledgement from the target of the FDA or from the SMSC). The SM manager 240 adds a copy of each accepted SM received to the replicate store 460 via the replicate manager 450. Each copy of an accepted SM can also include the identity of the SMSC to which the SM was forwarded or to which it should be forwarded if an FDA fails.

When a message timer associated with a SM expires, the SM manager 240 determines if the corresponding copy of the SM has been deleted from the replicate store 460. If the copy of the SM had been deleted (i.e. the FDA or forwarding to the SMSC was successful) no further action is required. If the copy of the SM still exists in the replicate store 460, the SM manager 450 provides for re-attempting the FDA or forwarding of the SM to the SMSC via the mobile telephony interface 210, the fixed network interface 220 or the SMSC interface 230. The identity of the SMSC to which the SM should be forwarded can be included in the copy of the SM. The SM manager 450 can optionally specify that a re-attempted forwarding of the SM to the SMSC take a different route than the original forwarding attempt.

In the event of a failure, the recovery manager 280 can read the contents of the replicate store 460 (i.e. the survivable storage medium) to determine which SM were potentially lost during the failure and sends these SM to the SM manager 240 for re-attempting a FDA or for forwarding to the SMSC.

The SM manager 240 can determined which recovered SM (i.e. identified as potentially lost) are to be FDA or forwarded to the SMSC based on which operation was outstanding during the failure, based on attributes of the SM (e.g. best effort delivery only), based on pre-determined policies (e.g. all recovered SM are forwarded to the SMSC) and combinations thereof. The recovery manager 280 determines which SM were potentially lost by identifying the SM for which a copy exists (i.e. have not been deleted) in the replicate store 460. The replicate store 460 can implement duplicate SM detection to prevent re-transmission of SM to an SMSC that are duplicates caused by automatic retransmission from an MS. The recovery manager 280 can also filter the SM that are recovered based on SM attributes so that only high value SM are recovered (e.g. excluding SM marked for a single delivery attempt only).

In an alternative embodiment where the replicate store 460 is hosted on an independent platform, preferably the recovery manager 280 is also hosted on the independent platform.

Figure 5:
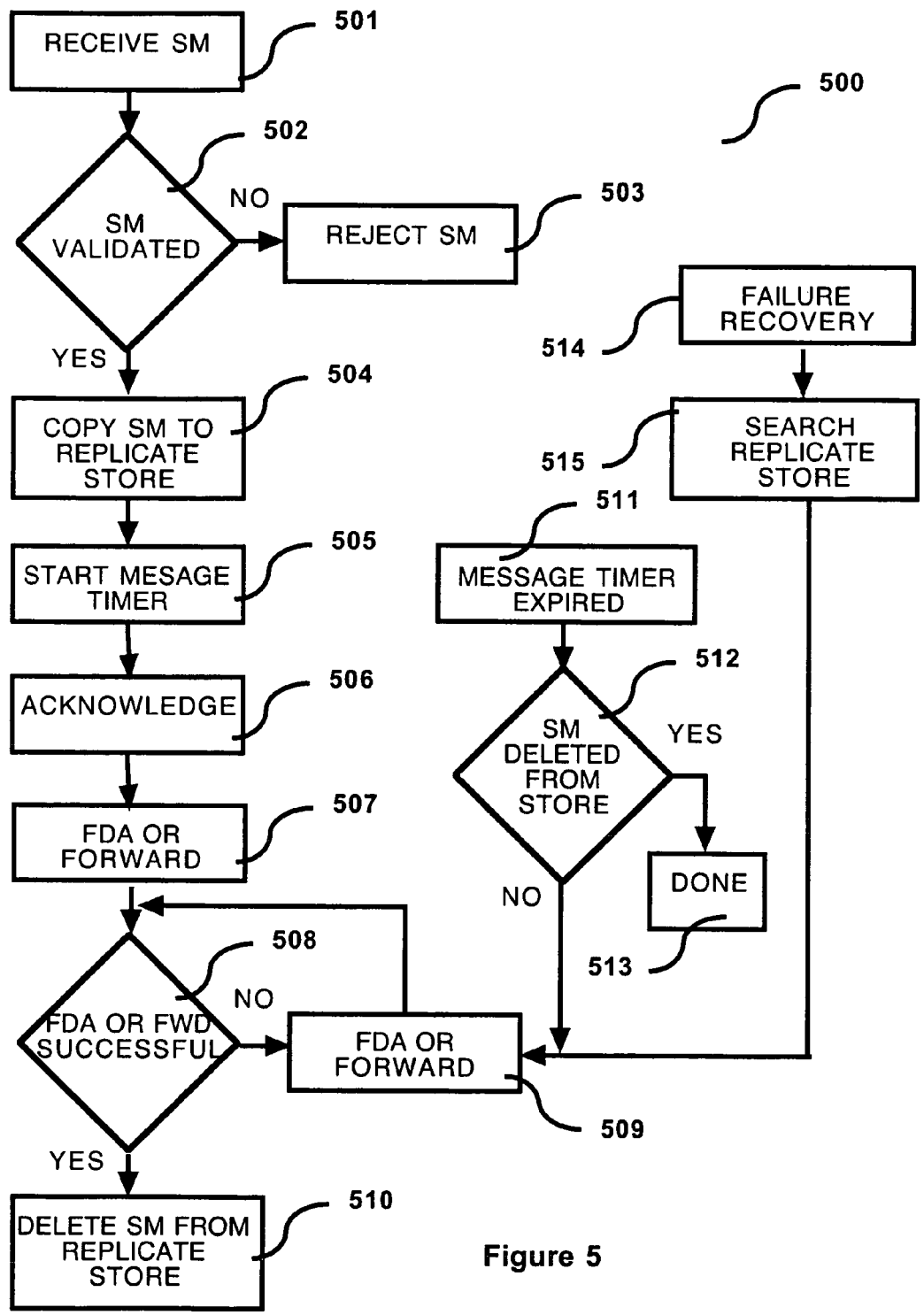
FIG. 5 is a representation of steps in a second exemplary embodiment of a method for improving short message service dependability.

FIG. 5 is a schematic representation of steps in an exemplary embodiment of a method 500 for improving short message service dependability. The method 500 can be implemented, for example, using the apparatus 200B described above with reference to FIG. 4.

In step 501 an SM is received from the mobile telephony network. In step 502 the received SM is validated. In step 503 if the SM fails validation it is rejected. In step 504 the SM is copied to a replicate store. A subsequent recovery process can extract the SM from the replicate store. In step 505 a message timer associated with the SM is started. In step 506 an acknowledgement is sent to a submitter of the SM. In step 507 either a FDA is made or the SM is forwarded to an SMSC based on the SM type, attributes of the SM, pre-defined policies and combinations thereof. In step 508 the outcome the FDA or the forwarding of the SM to the SMSC can be assessed. In step 509 if the FDA or the forwarding to the SMSC has not been successful the FDA or forwarding can be re-attempted. In step 510, when the FDA or the forwarding to the SMSC is successful, the copy of the SM stored in the replicate store is deleted. In step 511 the message timer has expired. In step 512 a determination is made as to whether the SM has been deleted from the replicate store. In step 513 if the SM has been deleted from replicate store (i.e. the FDA or the forward to the SMSC was successful) then no further processing of the SM is required. If the SM has not been deleted from the replicate store (i.e. the FDA or the forward to the SMSC has not been successful) then the FDA is re-attempted or the SM is forwarded to the SMSC in step 509 in accordance with the original handling of the SM. In step 514 recovery from a failure begins. The failures can include, for example, of the apparatus, of communications with the SMSC or of the SMSC before it secures the SM. In step 515, each SM is read from the replicate store. For each SM read from the replicate store a FDA is re-attempted or the SM is forwarded to the SMSC in step 509. A determination as to which of the recovered SM (i.e. read from the replicate store) are to be FDA or forwarded to the SMSC can be based on which operation was outstanding during the failure, based on attributes of the SM (e.g. best effort delivery only), based on pre-determined policies (e.g. all recovered SM are forwarded to the SMSC) and combinations thereof.

For the majority of SM, it is possible to delay sending an acknowledgment until the SM has either been delivered, or submitted to an SMSC. The router can minimize the number of messages requiring an early acknowledgment by starting a timer as soon as the SM is received and only sending an acknowledgment when the timer expires or when the SM is successfully delivered to the destination or submitted to the SMSC.

Figure 6:
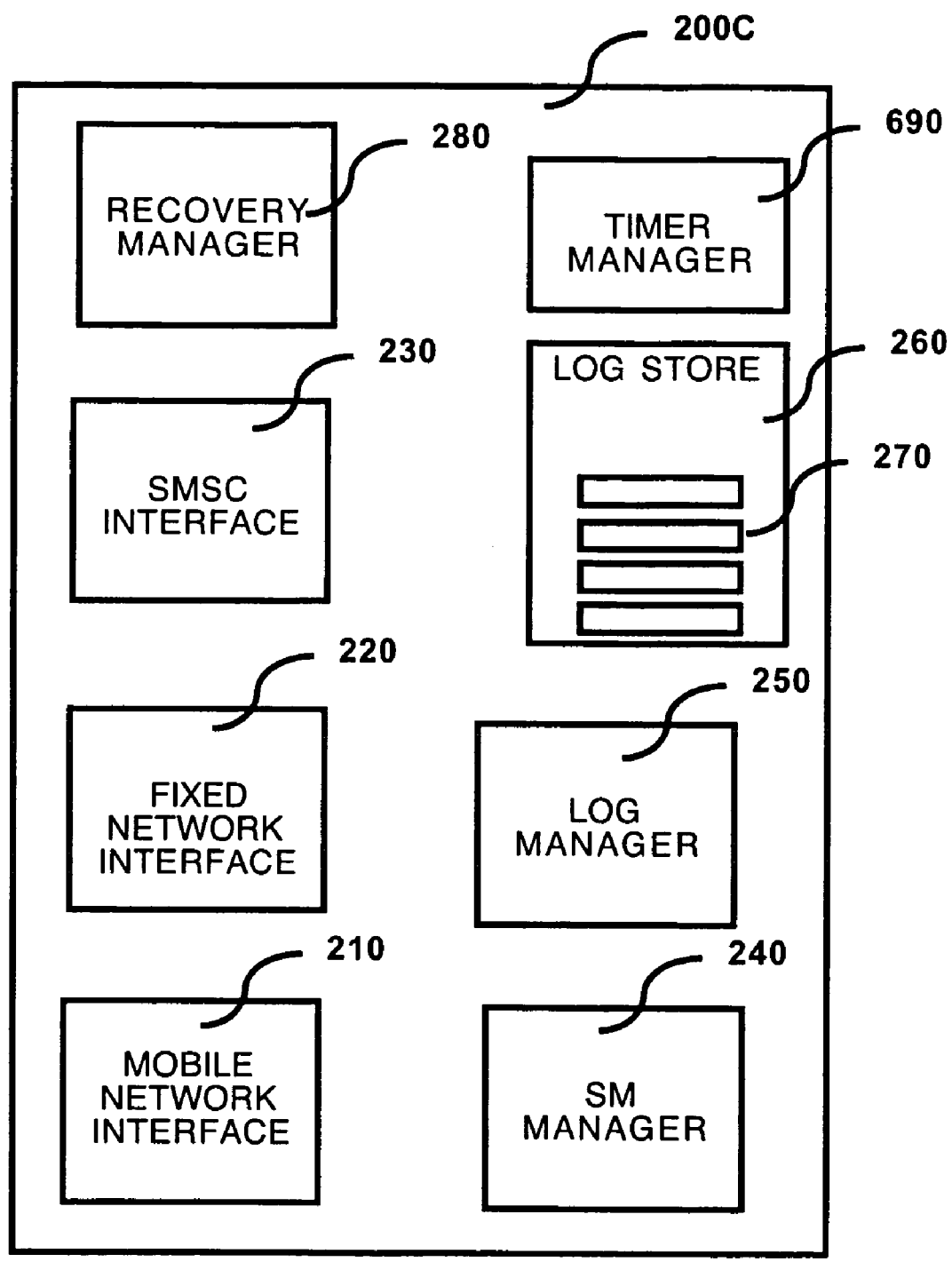
FIG. 6 is a schematic representation of a third exemplary embodiment of an apparatus for improving short message service dependability.

FIG. 6 is a schematic representation of a third exemplary embodiment of an apparatus 200C for improving short message service (SMS) dependability. The apparatus 200C is a SMS router comprising a mobile telephony network interface 210, a fixed network interface 220, a short message service centre (SMSC) interface 230, a SM manager 240, a log manager 250, a log store 260, a recovery manager 280 and a timer manager 690. The mobile telephony network interface 210, the fixed network interface 220, the short message service centre (SMSC) interface 230, the log manager 250, the log store 260 and the recovery manger 280 operate in substantially the same way as described above with reference to apparatus 200A and FIG. 2. The timer manager 690 provides for an acknowledge timer to be started for each SM which is received. The timer can be a count-down timer that is started at a predetermined value. The predetermined value is preferably chosen to be shorter than the anticipated acknowledgement time-out in the submitter MS in order to mitigate the likelihood of the MS re-submitting an unacknowledged SM. The SM manager 240 defers logging of the SM to the log store 260 and sending of an acknowledgement to the SM originator until expiry of the acknowledge timer associated with the SM. If the FDA or the forwarding to the SMSC of the SM has not successfully completed by the expiry of the acknowledgement timer, the SM manager 240 provides for an acknowledgement is sent to the originator of the SM and the SM to be logged to the log store 260. If the FDA or the forwarding to the SMSC completes successfully before the expiry of the acknowledge timer, the acknowledge can be sent immediately and the SM need not be logged. In an alternative embodiment the log manager 250 and the log store 260 can be replaced by a replicate manager 450 and a replicate store 460 as described above with reference to apparatus 200B and FIG. 4.

Figure 7:
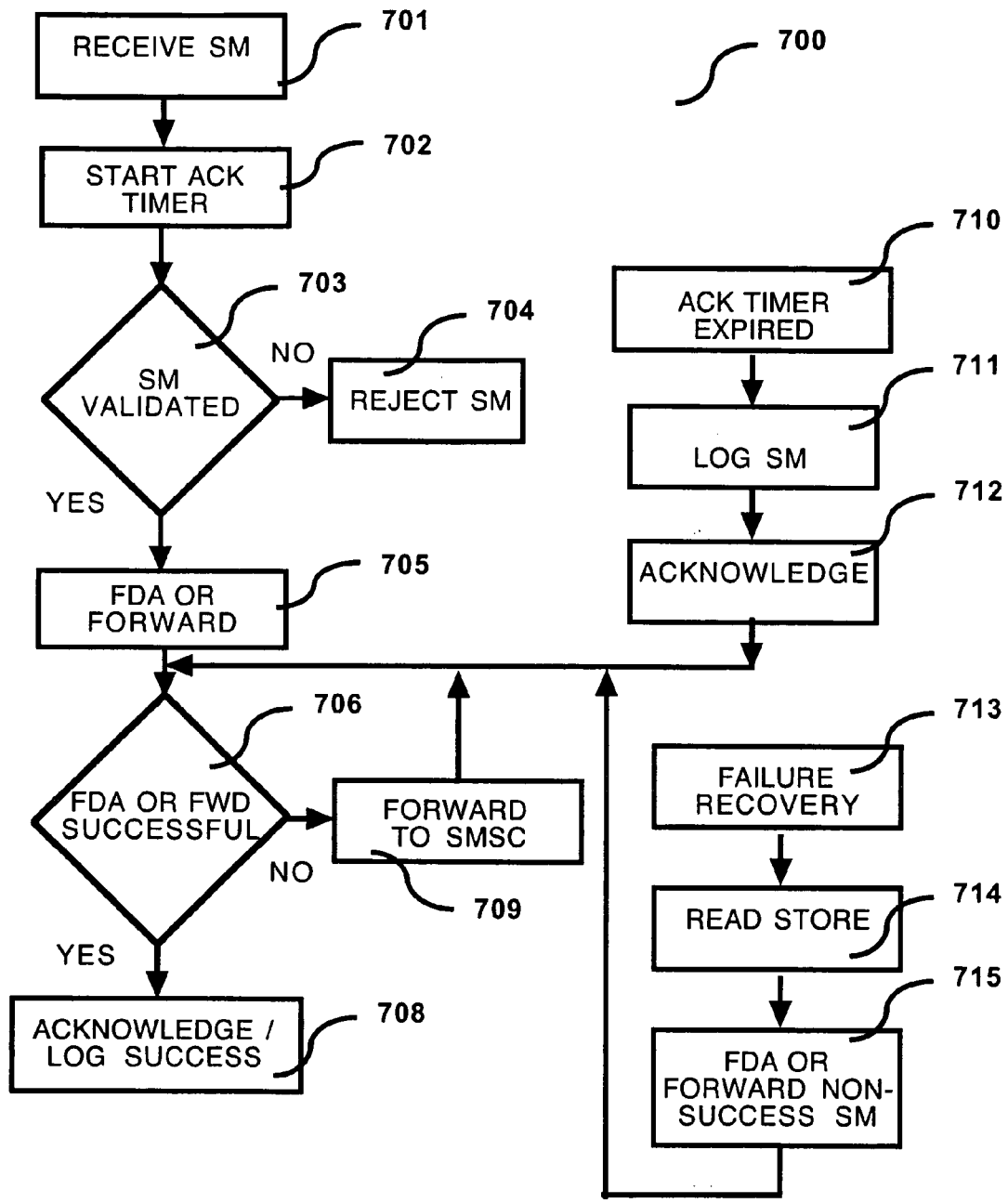
FIG. 7 is a representation of steps in a third exemplary embodiment of a method for improving short message service dependability.

FIG. 7 is a schematic representation of the steps in an exemplary embodiment of a method 700 for improving short message service dependability. The method 700 can be implemented, for example, using the apparatus 200C described above with reference to FIG. 6.

In step 701 a SM is received. In step 702 an acknowledge timer associated with the SM is started. In step 703 the SM is validated. If the SM fails validation it is rejected in step 704. If the SM passes validation, in step 705, a FDA is made or the SM is forwarded to the SMSC based on the SM type, attributes of the SM, pre-defined policies and combinations thereof. In step 706 successfully completion of the FDA or forward to SMSC is determined. If a successful completion of the FDA or forward to SMSC has occurred before the timer expires, in step 708 an acknowledgement is sent to the SM submitter. In step 710, the timer expires before the successful completion of the FDA or forward to SMSC has occurred. In step 711 the SM is logged to a survivable store such as, for example, a log store 250. In step 712 an acknowledgement is sent to the SM submitter. Processing continues in step 706 whether successful completion of the FDA or forward to the SMSC is determined. If the FDA or the forward to the SMSC was unsuccessful, the FDA is re-attempted or the SM is re-forwarded to the SMSC in step 709. If the FDA or the forward to the SMSC was successful after the acknowledge timer expired (i.e. after the SM was logged) then in step 708 the successful completion of the FDA or the forward to the SMSC is logged to the survivable store. In step 713 recovery from a failure begins. The failures can be, for example, of the apparatus, of communications with the SMSC or of the SMSC before it secures the SM. In step 714 the contents of the survivable store is read in order to determine which SM may not have been safely delivered. SM having both an initial log entry and a second log entry signifying their successful delivery are not recovered. SM having only an initial log entry and no subsequent log entry signifying their successful delivery are recovered from the survivable store. For each SM recovered in step 714, a FDA or forwarding is re-attempted in step 715. A determination as to which of the recovered SM (i.e. read from the replicate store) are to be FDA or forwarded to the SMSC can be based on which operation was outstanding during the failure, based on attributes of the SM (e.g. best effort delivery only), based on pre-determined policies (e.g. all recovered SM are forwarded to the SMSC) and combinations thereof.

In an alternative embodiment of the method 700 which can be implemented on, for example, apparatus 200B as described above with reference to FIG. 4 with the addition of timer manager 690, steps 711 and 708 differ from those described above. In step 711 rather than logging the SM to the log store 260, a copy of the SM is be added in the replicate store 460. In step 708, in the case of a successful completion of the FDA or forwarding to the SMSC after the acknowledge timer has expired, rather than logging the successful completion, the copy of the SM stored in the replicate store 460 is deleted.

Each of the methods described above can be implemented using a computer program product comprising computer executable program codes devices stored on a computer readable storage medium.

For each of the embodiments described above, preferably all data is written to the survivable storage medium asynchronously. Alternatives include synchronous writes to a memory cache with a battery back-up power supply or synchronous writes to a storage area network (SAN).

The log records can also include sufficient information to allow a value of the SM to be determined. This allows selective replay of high value SM only.

The log records in the survivable store can also contain state information to ensure that operations staff can determine the fate of the SM from the log data both for troubleshooting and for statistical purposes.

The preferred approach is to have comparatively small logs created periodically so that the recent data can be replayed quickly without the need to worry about older irrelevant data. The router preferably automatically manages its log records to ensure that the storage requirement is kept within manageable limits.

MO requests to query, delete and update SM can be logged for statistical purposes, but do not need to be logged for recovery purposes. Such requests can be forwarded directly to the SMSC holding the target SM and acknowledged to the submitter once the SMSC has acknowledged receipt.

Both fixed network applications and MS have the opportunity to specify on submission that an SM should only receive a single delivery attempt. Furthermore operator policies may enforce this quality of service on certain SM or at certain times. Such SM can be logged for statistical purposes, but do not need to be logged for recovery purposes. It must be possible from the log to distinguish such SM from SM that need to be replayed.

For each of the embodiments described above when recovery is required the replaying of SM from the log, can be performed selectively based on the attributes (e.g. the value of the SM, the addressee of the SM, or the type of contract (e.g. pre-pay, post-pay) held by the originator of the SM) of the SM if necessary.

Typically SMS routers are able to generate status reports (SR) to inform the submitter of an SM about the outcome of attempts to deliver that SM. If the router is unable to deliver an SR then it can either: give up and lose the SR or; forward the SR to an SMSC or; store the SR and retry delivery later. This is equivalent to the SM forward and store quality of service. In networks where the delivery of SR is considered important, SR can also be written to the survivable store as soon as is practical after they are created.

The SM/SR details logged by the router can also be used to recover from catastrophic failures of an SMSC. If there is a disaster causing an SMSC to fail for a prolonged period, then the logged details of an SM that the router has directed to the SMSC can be replayed and a decision made as to whether to resubmit the SM/SR to an alternate SMSC based on: attributes of the SM/SR; the time at which the SM/SR was submitted to the SMSC; and the reason why any delivery attempt(s) failed.

It will be apparent to one skilled in the art that numerous modifications and departures from the specific embodiments described herein may be made without departing from the spirit and scope of the present invention.

What is claimed is:

1. A method for improving short message service (SMS) dependability in a mobile telephony network having a short message service center (SMSC) that can provide for persistently storing and forwarding of short messages (SM) to respective addressees and a router that first receives the SM and mitigates the number of SM forwarded to the SMSC by attempting to deliver a portion of the SM received, the method comprising the steps of:

receiving a SM from a submitter;
creating a first log entry, including a copy of the SM, in a log store;
acknowledging receipt of the SM to the submitter;
attempting one of a first delivery attempt (FDA) of the SM to an addressee and a forwarding (FWD) of the SM to the SMSC;
on recovery from a failure, determining that a second log entry is not found, indicating that the one of the FDA and the FWD failed;
re-attempting the one of the FDA and the FWD using the copy of the SM included in the first log entry; and
on successful completion of the one of the FDA and the FWD, creating the second log entry, including an indication of the successful completion, in the log store;
wherein the log store is a survivable storage medium whose contents can survive a failure of the router and wherein the step of creating a first log entry occurs before the step of acknowledging.

2. The method of claim 1, wherein log entries are written sequentially to the log store.

3. The method of claim 1, wherein the first log entry includes an indication of whether a FDA or a FWD is to be attempted and in the case of the FWD also includes an identifier of the SMSC.

4. The method of claim 1, further comprising the step of starting an acknowledge timer when the SM is received; and wherein the steps of:

creating a first log entry; and
acknowledging receipt;
occur when the acknowledge timer has expired and a successful completion of the one of the FDA and the FWD has not occurred.

5. The method of claim 4, wherein the duration of the acknowledge timer is less than an anticipated acknowledge time-out duration for the submitter.

6. A method for improving short message service (SMS) dependability in a mobile telephony network having a short message service center (SMSC) that can provide for persistently storing and forwarding of short messages (SM) to respective addressees and a router that first receives the SM and mitigates the number of SM forwarded to the SMSC by attempting to deliver a portion of the SM received, the method comprising the steps of:

receiving a SM from a submitter;
starting an acknowledge timer when the SM is received;
when the acknowledge timer expires and a successful completion of one of a first delivery attempt (FDA) of the SM to an addressee and a forwarding (FWD) of the SM to the SMSC has not occurred:
    creating a copy of the SM in a replicate store; and
    acknowledging receipt of the SM to the submitter;
attempting the one of the FDA and the FWD;
on recovery from a failure, determining that the copy of the SM is found in the replicate store, indicating that the one of the FDA and the FWD failed;
re-attempting the one of the FDA and the FWD using the copy of the SM; and
on the successful completion of the one of the FDA and the FWD, deleting the copy of the SM in the replicate store;
wherein the replicate store is a survivable storage medium whose contents can survive a failure of the router and wherein the step of creating a copy of the SM occurs before the step of acknowledging.

7. The method of claim 6, further comprising the steps of:
starting a message timer after the step of creating a copy of the SM; and
reattempting the one of the FDA and the FWD when the message timer has expired and the copy of the SM has not been deleted from the replicate store.

8. The method of claim 6, wherein the duration of the acknowledge timer is less than an anticipated acknowledge time-out duration for the submitter.

9. An apparatus for improving short message service (SMS) dependability in a mobile telephony network comprising:
    a mobile telephony network interface adapted to receiving a short message (SM) from a submitter in the mobile telephony network and for sending an acknowledgement to the submitter;
    a fixed network interface adapted to forwarding the SM to an addresses;
    an SMSC interface adapted to forwarding the SM to a short message service center (SMSC);
    a log store adapted to storing log entries and to preserving the log entries in the case of a failure of the apparatus;
    a log manager adapted to adding and retrieving log entries to and from the log store;
    a recovery manager adapted to, on recovery from a failure, determining that a second log entry is not found, indicating that one of a first delivery attempt (FDA) of the SM to an addressee and a forwarding (FWD) of the SM to the SMSC failed; and
    a SM manager adapted to:
        creating a first log entry, including a copy of the SM, in the log store via the log manager;
        sending an acknowledgement to the submitter via the mobile telephony network interface after creating the first log entry;
        attempting the one of the FDA and the FWD, via the fixed network interface and the SMSC interface respectively; and
        in response to the recovery manager determining that the second log entry is not found, re-attempting the one of the FDA and the FWD using the copy of the SM included in the first log entry; and
        creating, on successful completion of the one of the FDA and the FWD, a second log entry, including an indication of the successful completion, in the log store via the log manager.

10. The apparatus of claim 9, wherein the log store stores log entries sequentially.

11. The apparatus of claim 9, wherein the first log entry includes an indication of whether a FDA or a FWD is to be attempted and in the case of the FWD also includes an identifier of the SMSC.

12. The apparatus of claim 9, further comprising a timer manager adapted to starting an acknowledge timer when the SM is received; and wherein the SM manager is further adapted to
    creating the first log entry and sending the acknowledgement when the acknowledge timer has expired and a successful completion of the one of the FDA and the FWD has not occurred.

13. The apparatus of claim 12, wherein the duration of the acknowledge timer is less than an anticipated acknowledge time-out duration for the submitter.

14. An apparatus for improving short message service (SMS) dependability in a mobile telephony network comprising:
    a mobile telephony network interface adapted to receiving a short message (SM) from a submitter in the mobile telephony network and for sending an acknowledgement to the submitter;
    a timer manager adapted to starting an acknowledge timer when the SM is received;
    a fixed network interface adapted to forwarding the SM to an addresses;
    an SMSC interface adapted to forwarding the SM to a short message service center (SMSC);
    a replicate store adapted to storing a copy of the SM, and to preserving the copy of the SM in the case of a failure of the apparatus;
    a replicate manager adapted to adding and deleting the copy of the SM to and from the replicate store;
    a recovery manager adapted to determining, on recovery from a failure, that the copy of the SM is found in the replicate store, indicating that one of a first delivery attempt (FDA) of the SM to an addressee and a forwarding (FWD) of the SM to the SMSC failed;
    a SM manager adapted to:
        when the acknowledge timer expires and a successful completion of one of the FDA and the FWD has not occurred:
            adding the copy of the SM to the replicate store via the replicate manager; and
            sending an acknowledgement to the submitter via the mobile telephony network interface after creating the first log entry;
        attempting the one of a first delivery attempt (FDA) of the SM to an addressee and a forwarding (FWD) of the SM to the SMSC, via the fixed network interface and the SMSC interface respectively; and
        in response to the recovery manager determining that the copy of the SM is found in the replicate store, re-attempting the one of the FDA and the FWD using the copy of the SM; and
        deleting, on the successful completion of the one of the FDA and the FWD, the copy of the SM from the replicate store via the replicate manager.

15. The apparatus of claim 14, the SM manager further adapted to:
    starting a message timer after creating a copy of the SM;
    reattempting the one of the FDA and the FWD when the message timer has expired and the copy of the SM has not been deleted from the replicate store.

16. The apparatus of claim 14, wherein the duration of the acknowledge timer is less than an anticipated acknowledge time-out duration for the submitter.

* * * * *